(12) United States Patent
Pain et al.

(10) Patent No.: US 7,268,814 B1
(45) Date of Patent: Sep. 11, 2007

(54) TIME-DELAYED-INTEGRATION IMAGING WITH ACTIVE PIXEL SENSORS

(75) Inventors: Bedabrata Pain, Los Angeles, CA (US); Thomas J. Cunningham, Pasadena, CA (US); Guang Yang, West Covina, CA (US); Monico Ortiz, South Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 805 days.

(21) Appl. No.: 09/680,239

(22) Filed: Oct. 5, 2000

Related U.S. Application Data

(60) Provisional application No. 60/157,885, filed on Oct. 5, 1999.

(51) Int. Cl.
*H04N 3/14* (2006.01)
*H04N 5/335* (2006.01)

(52) U.S. Cl. ........................ 348/294; 348/295

(58) Field of Classification Search ................ 348/295, 348/222.1, 224.1, 225.1, 226.1, 227.1, 228.1, 348/229.1, 665, 294, 297, 216.1
See application file for complete search history.

(56) References Cited

U.S. PATENT DOCUMENTS

| | | | |
|---|---|---|---|
| 4,779,005 A | | 10/1988 | Arnold |
| 5,149,954 A | * | 9/1992 | Pettijohn et al. .......... 250/208.1 |
| 5,543,838 A | * | 8/1996 | Hosier et al. ................ 348/311 |
| 5,619,040 A | * | 4/1997 | Shapiro et al. ........ 250/370.09 |
| 5,668,887 A | * | 9/1997 | Parker et al. ................ 382/108 |
| 5,812,190 A | * | 9/1998 | Audier et al. ................ 348/295 |
| 5,828,408 A | * | 10/1998 | Mottin et al. ................ 348/295 |
| 5,886,659 A | | 3/1999 | Pain et al. |
| 5,909,026 A | | 6/1999 | Zhou et al. |
| 5,917,620 A | * | 6/1999 | Hasegawa et al. .......... 358/513 |
| 5,949,483 A | | 9/1999 | Fossum et al. |
| 5,965,871 A | | 10/1999 | Zhou et al. |
| 6,115,065 A | | 9/2000 | Yadid-Pecht et al. |
| 6,259,108 B1 | * | 7/2001 | Antonelli et al. ........... 250/556 |
| 6,787,749 B1 | * | 9/2004 | Zhou et al. .............. 250/208.1 |
| 6,943,721 B1 | * | 9/2005 | Aswell et al. ............... 341/172 |

FOREIGN PATENT DOCUMENTS

WO    WO9948281 A1 *  9/1999

\* cited by examiner

*Primary Examiner*—Vivek Srivastava
*Assistant Examiner*—Yogesh Aggarwal
(74) *Attorney, Agent, or Firm*—Fish & Richardson P.C.

(57) ABSTRACT

Imaging techniques and devices for performing time-delayed integration based on active pixel sensors. An integrator array is integrated on the chip with the active pixel sensors to perform correlated double sampling and the signal summing based switching capacitor banks.

17 Claims, 9 Drawing Sheets

TIME-DELAYED-INTEGRATION IMAGING WITH ACTIVE PIXEL SENSORS

This application claims the benefit of U.S. Provisional Application No. 60/157,885, filed on Oct. 5, 1999, entitled "LOW POWER ACCURACY TIME-DELAYED-INTERGRATION IMAGER IMPLEMENTATION USING CMOS IMAGING APPROACH."

ORIGIN OF INVENTION

The invention described herein was made in the performance of work under a NASA contract, and is subject to the provisions of Public Law 96-517 (35 U.S.C. 202) in which the Contractor has elected to retain title.

BACKGROUND

This application relates to imaging devices and techniques, and more particularly to imaging devices and techniques based on semiconductor sensors.

Image sensors are widely used in many applications to produce images of various objects. Imaging circuits often include a two-dimensional array of photosensors that are designed to produce output signals in response to photons. Each photosensor can be used to form a portion or the entirety of one picture element (pixel) of the image. The individual photosensors can be scanned to read out and process the output signals for various imaging operations.

One class of solid-state image sensors includes an array of active pixel sensors (APS) formed on a semiconductor substrate. An APS is a light sensing device with sensing circuitry inside each pixel. Each active pixel includes a sensing element formed in a semiconductor substrate and capable of converting optical signals into electronic signals. As photons strike the surface of a photoactive region within each active pixel, free charge carriers are generated and collected. Once collected, the charge carriers are converted into an electrical signal within each pixel. Hence, distinctly different from a charge coupled device (CCD) or a metal oxide semiconductor (MOS) diode array, an APS device does not transfer charge from one pixel to another for readout. The APS can convert the photocharge to an electronic signal prior to transferring the signal to a common conductor that conducts the signals to an output node.

APS devices can be fabricated in a manner compatible with complementary metal oxide semiconductor (CMOS) processes. Compatibility with CMOS processes allows many signal processing functions and operation controls to be integrated on an APS chip at a relatively low cost. CMOS circuitry also allows simple power supplies to be used and can result in reduced power consumption. Moreover, the active pixels of APS devices allow non-destructive readout, simplified digital interface, and random access.

SUMMARY

The present disclosure includes an imaging device which has a photosensing array and an integrator array. The photosensing array includes sensing pixels arranged in rows and columns. Each pixel has a photosensing element to produce charge in response to incident photons from an object and an in-pixel circuit to convert said charge into an electrical pixel signal representing the charge. The integrator array has integrators arranged in the same numbers of rows and columns as the photosensing array. The integrators of each column are coupled to receive electrical pixel signals from only one designated column of sensing pixels in the photosensing array and are operable to produce time-delayed integration signals representing the object after each sensing pixel is sampled and read out for the number of the rows in the photosensing array.

DESCRIPTION OF DRAWINGS

Like reference symbols in the various drawings indicate like elements.

DETAILED DESCRIPTION

The time-delayed integration of the present disclosure is used to accumulate the electrical output signals that sequentially generated by a series of active sensing pixels in a CMOS APS array to produce a sum signal. Since the constituent electrical signals of this sum signal are obtained by their respective pixels at different times that are delayed relative to one another by a fixed amount delay time due to the scanning operation, the sum signal is referred to as a "time-delayed integration" signal.

One example of the applications for this time-delayed integration is imaging an object that moves relative to the imaging device. In a regular "snapshot" imaging operation, the sensing pixels are controlled to collect photons from an object for a given exposure time. The output signals from different pixels are independent from one another and represent different pixels in the output image. When the object and the imaging device are stationary relative to each other, the exposure time can be lengthened to increase the signal-to-noise ratio by collecting more photons if the object is not sufficiently bright. Alternatively, multiple snapshots can be taken for a scene in the stationary imaging situation. The multiple snapshots or frames are then simply added together to produce a final image with an improved signal-to-noise ratio.

When the object moves relative to the imaging device, however, the prolonged exposure imaging is not feasible because the captured image can be "smeared" when the exposure time is too long and the photons from one location of the object are collected by two or more adjacent pixels along the direction of the relative motion. The simple addition of multiple frames suffers the smearing problem since different frames are taken at different times and the image of the object has moved from one location on the sensing array to another location during that time.

The present time-delayed integration in part modifies the above integration of multiple frames to add pixel signals from different sensing pixels in different frames that correspond to the same image to produce the proper integrated image. In another perspective, multiple frames are also taken here. However, different frames are shifted from one another along the direction of the relative motion to account for the motion and then the shifted frames are added together. Hence, the imaging smearing due to the relative motion can be reduced to achieve a desired signal-to-noise ratio in the final integrated image.

Figure 1A:
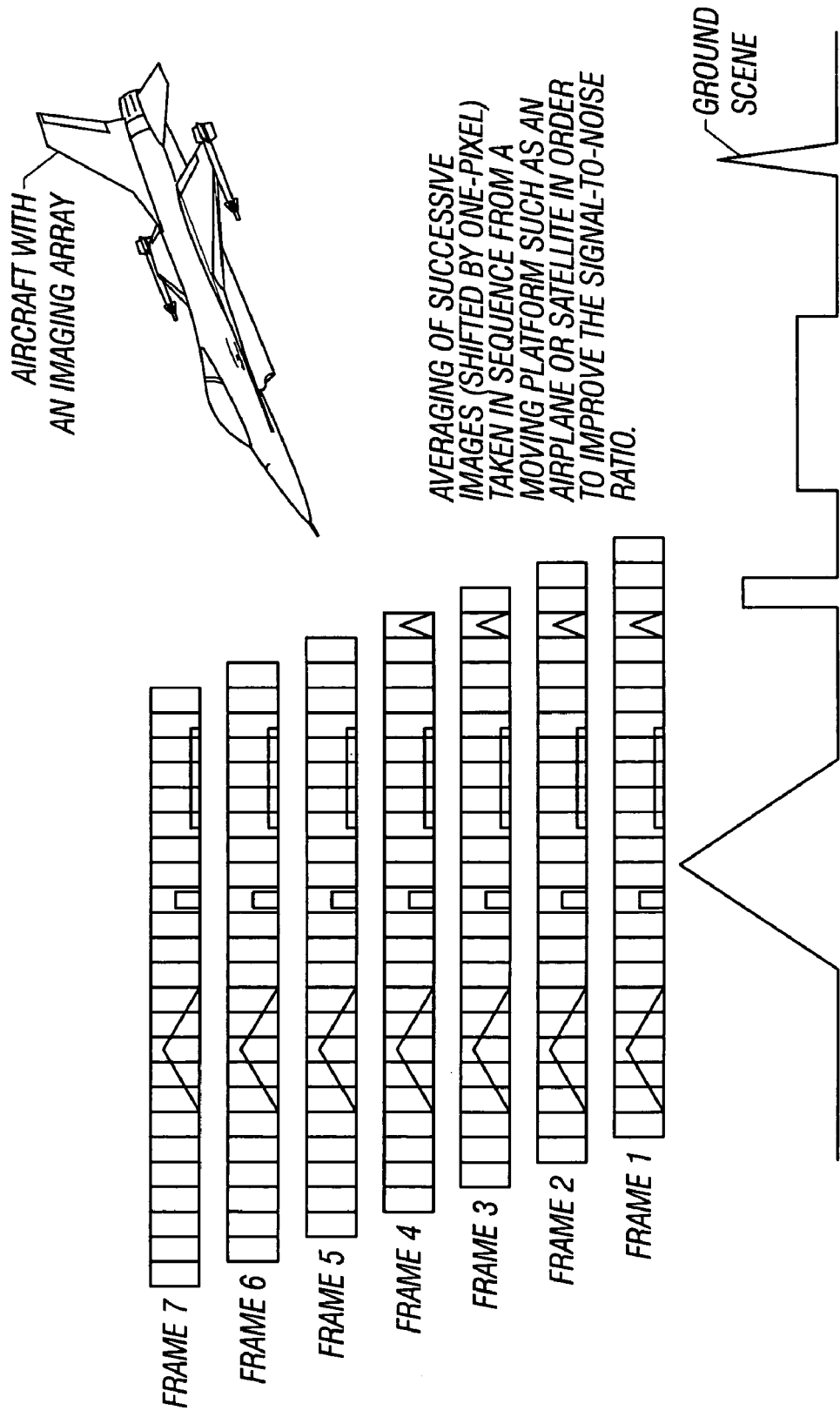
FIG. 1A illustrates an example of the time-delayed integration.

FIG. 1A illustrates the above time-delayed integration technique by using an aircraft-mounted imaging array device to take images of a ground scene. Seven consecutive frames taken by the imaging device are shown. Due to the motion of the aircraft, the ground scene projects at different locations on the imaging array along the direction of motion. However, if the frames are spatially shifted by one pixel between any two consecutive frames, the sensing pixels in the different frames with the same ground scene are aligned and hence can be added to form the proper integrated image without smearing.

Figure 1B:
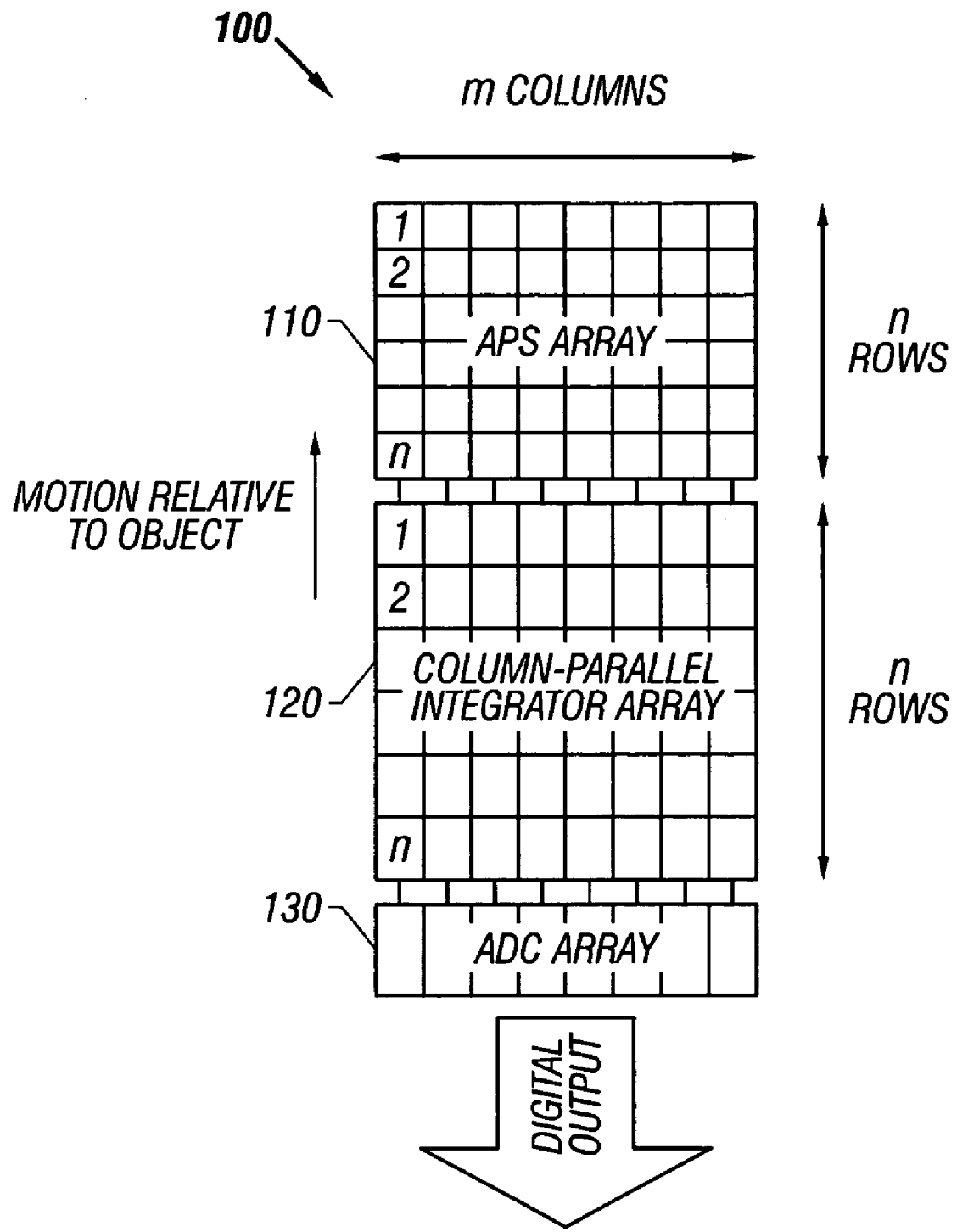
FIG. 1B shows one embodiment of an active pixel sensing device with time-delayed integration circuitry.

FIG. 1B shows one exemplary APS imaging device 100 with on-chip time-delayed integration circuitry according to one embodiment. The APS imaging device 100 includes an APS array 110 with APS sensing pixels arranged in m columns and n rows and an analog integrator array 120, both fabricated on a common substrate. In operation, the imaging device 100 may be oriented in a way so that the column direction is substantially parallel to the moving direction of the object to be imaged relative to the imaging device 100. The integrator array 120 is designed and interfaced with the APS array 110 to implement above time-delayed integration.

The APS array 110 may be formed by any suitable APS design. Each APS sensing pixel includes a photoactive element, such as a photogate or a photodiode, to collect photons and to produce charge in response to the collected photons. The charge is then transferred to an in-pixel circuit which internally converts the charge into a pixel electrical signal. In one embodiment, the in-pixel circuit may include an isolated diffusion region and a transfer gate located between the photoactive element and the diffusion region. The diffusion region receives the charge and sends a corresponding electrical signal to a pixel amplifier for further processing.

The APS array 110 may be formed with CMOS-compatible active pixel sensors integrated on a semiconductor substrate. The integrators may also be integrated with the APS array 110 on the same substrate by using the CMOS technology to perform the time-delayed integration. Such a CMOS imaging device hence can combine the time-delayed integration mechanism with various advantages and on-chip processing functionalities of the CMOS APS technology. Since each APS pixel internally converts the photon-induced charge into an electrical signal, charge transfer from one pixel to another is avoided.

One implementation of a photogate-based APS is disclosed in U.S. Pat. No. 5,471,515 to Fossum et al., which is incorporated herein by reference. One feature of this APS array is a correlated double sampling mechanism. Fossum discloses a readout circuit fabricated on the sensor substrate but outside the APS sensors. In the readout circuit, a signal sample and hold circuit is used to sample the potential of the floating diffusion region at end of each integration period to obtain a total signal from that pixel. Another reset sample and hold circuit is used to sample the potential of the floating diffusion region again after the diffusion region is reset to obtain the reset potential value. A differential circuit is coupled to the both sample and hold circuits to produce an output that represents the difference between the total signal and the reset signal. This double sampling significantly reduces the readout noise such as the kTC noise. This double sampling is implemented in the present device 100 in a different way by using the integrator array 120.

The integrator array 120 includes m×n analog integrators that are also arranged in m columns and n rows. The integrator array 120 is connected to the APS array 110 in a column-parallel configuration so that one column of the integrators is coupled to receive signals from only one column of the APS sensing pixels. Each integrator is designed so that this column-parallel configuration can be used to effectuate a n-stage time-delayed integration from n APS sensing pixels and n integrators of the same column. Hence, n output signals from n different APS sensing pixels of the same column that are generated at different times are integrated together to generate one pixel signal of the output image which represents an image of a location on the object. Cross-track coverage is provided by m APS sensing pixels in each row. The column-parallel design allows signal processing at different columns to proceed in parallel at the same time.

Analog to digital conversion may also be implemented on the APS imaging device 100. An ADC array 130 of m ADCs may be fabricated on the same substrate in a column-parallel configuration so that each ADC is designated to convert the time-delayed signals from one column of the integrator array 120. Alternatively, a single ADC may be used to convert the signals from the entire integrator array 120 or an ADC array of mn ADS may be used so that all output signals from the mn integrators may be digitized in parallel.

The following describes in detail the circuitry and operations of the integrator array 120. In this column-parallel configuration, the signal levels of the APS sensing pixels of a given row can be added to any one of the integrators in the columns corresponding to the sensing pixels. Different integrators in a column store pixel values of successive locations on the object that are collected by different APS sensing pixels and are accumulated over n frame times. A frame time is defined as the time needed to read out the entire APS array 110. In this configuration, the frame time is also the integration time for each pixel and the time for readout of one line of the image of the object in the final output.

Figure 1C:
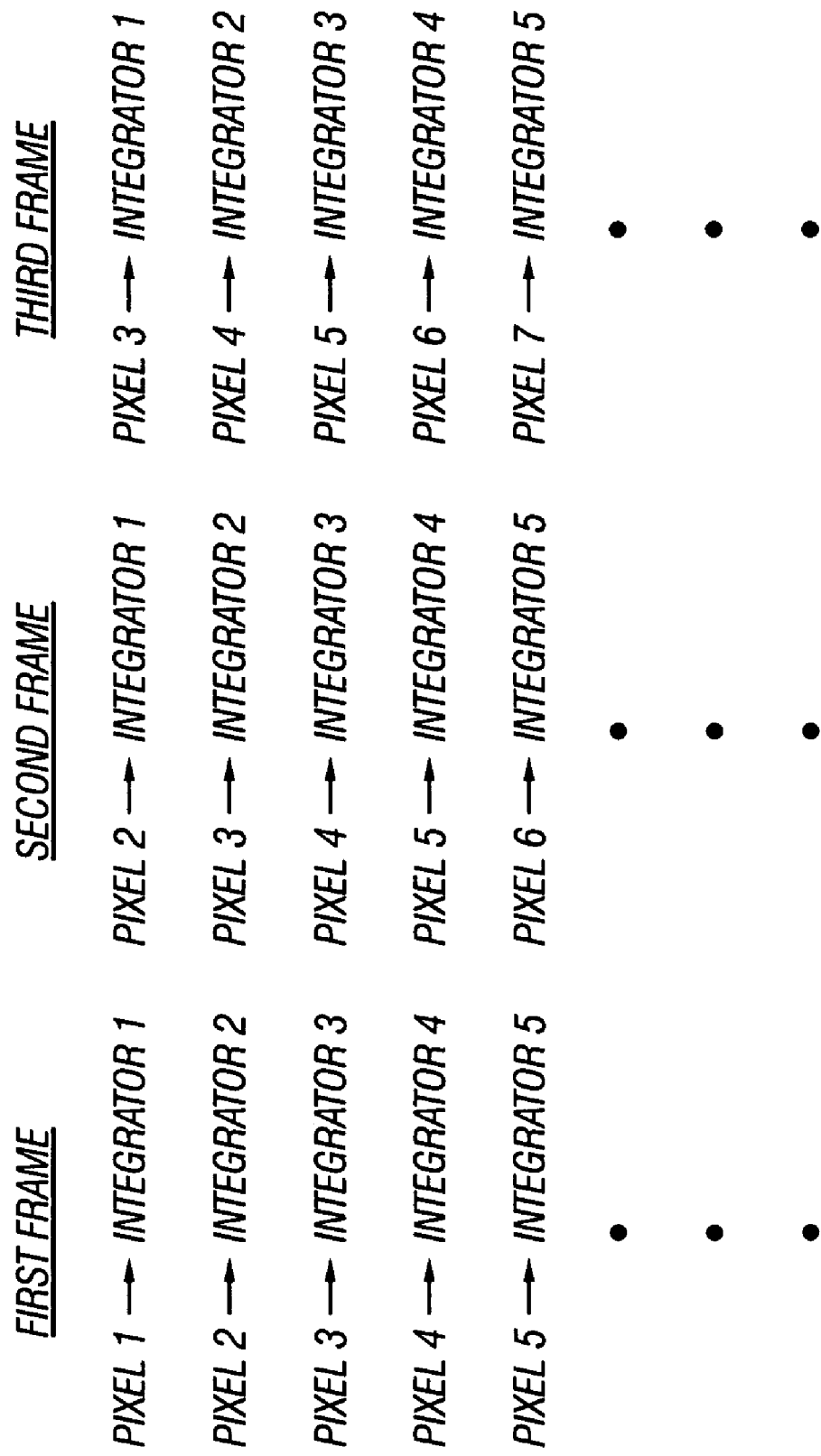
FIG. 1C shows a table that illustrates the mapping from the sensing array to the integrator array in the device of FIG. 1B during three consecutive frames.

In implementing the n-stage time-delayed integration, the APS array 110 are controlled to produce multiple consecutive frames at different times as illustrated in FIG. 1A. The pixel signals of each frame, however, are copied to the integrator array 120 by shifting along the column direction by one row at a time, which is also illustrated in FIG. 1A FIG. 1C is a table that illustrates mapping between the APS sensing pixels in a column to the integrators in the same column during 3 consecutive frames. At any given frame, the APS sensing pixels and the integrators of the same column have a one-to-one mapping relationship. For a given integrator, the mapping changes between two consecutive frames. In particular, the coupling between the integrator array 120 and the APS array 110 is controlled so that succeeding APS sensing pixels of a given column are connected to a designated integrator in succeeding frames, respectively. This designated integrator hence produces one time-delayed integration signal for one pixel of the final output image. This scheme allows a given point on the object to be mapped to a selected integrator and hence reduces the imaging smear due to the relative motion.

Therefore, according to the above mapping, during any given frame time, the signal from a pixel in a given row k is added to the contents of an integrator in a given row j of the same column. Since it takes n integrations to produce one line image of the object, the pixel values need be sampled at a sampling rate n times faster than the frame rate in order to provide a line image for every frame. Thus, during a given frame time, one row of integrators have accumulated the signal from all the n previous frame and are ready to be read out.

The integrator array 120 is also controlled to read the APS array 110 twice during each frame to correct offset effects. After all the sensing pixels in the APS array is reset, the integrator array 120 samples each of the pixel reset values. Then after the photo-induced signals are dumped from the photosensing element and are converted into electrical pixel signals, the integrator array 120 samples each APS pixel for the second time to get each of the signals. Each integrator in the array 120 then operates to subtract the two values to retain the differential value. This completes one integration of one frame. This double sampling and differentiation repeat for each frame. Exemplary implementations based on switched-capacitor designs are described later.

The time-delayed integration imaging device 100 may demand a high processing speed on the integrator array 120. Assuming, for example, the line scanning rate is L, the integration and readout then need proceed at a rate n×L for the n-stage time-delayed integration. In addition, each integrator usually needs two clock cycles to complete a single integration, one for reset and another for accumulation. Each pixel may also need multiple clock cycles to complete a sampling operation. In one implementation of a photogate-based APS array, the pixel operation includes at least 4 clock cycles: pixel reset (RST), reset sampling (SHR), photogate dump (PG), and signal sampling (SHS). Hence, a total of 6n clock cycles may be needed to complete the time-delayed integration for one line. Assuming a line rate of L=50k lines per second and n is 32, the clock speed is on the order of 10 MHz. The noise performance of the readout may be compromised at such a high clock speed. Furthermore, the column-parallel design can limit the physical size for each integrator in the array 120 to the size of the APS sensing pixel (e.g., a pitch of about 10 microns). This physical limitation can make it difficult to implement a low-noise but high-speed integrator.

One feature of the device 100 is to implement a special integrator array 120 so that signal processing for one pixel in a column temporarily overlaps with signal processing for adjacent pixels. Such a temporal pipelined operation of different rows within a column, in combination with the column-parallel processing, can reduce the above requirement for a high clock speed while maintaining the overall operating speed of the imaging device 100.

Another feature of the device 100 is to reduce the noise such as offsets and parasitic effects in the signal processing. The correlated double sampling mechanism of the APS array 110 significantly reduces the noise from the APS array 110. However, the time-delayed integration operation and the presence of the integrator array 120 also raise additional noise problems such as offsets and parasitic effects inherent in the integrators.

Those and other issues are addressed in the design of the integrator array 120. In particular, special switched-capacitor integrators are implemented to reduce the additional noise. The following are several exemplary designs of the integrator array 120.

Figure 2A:
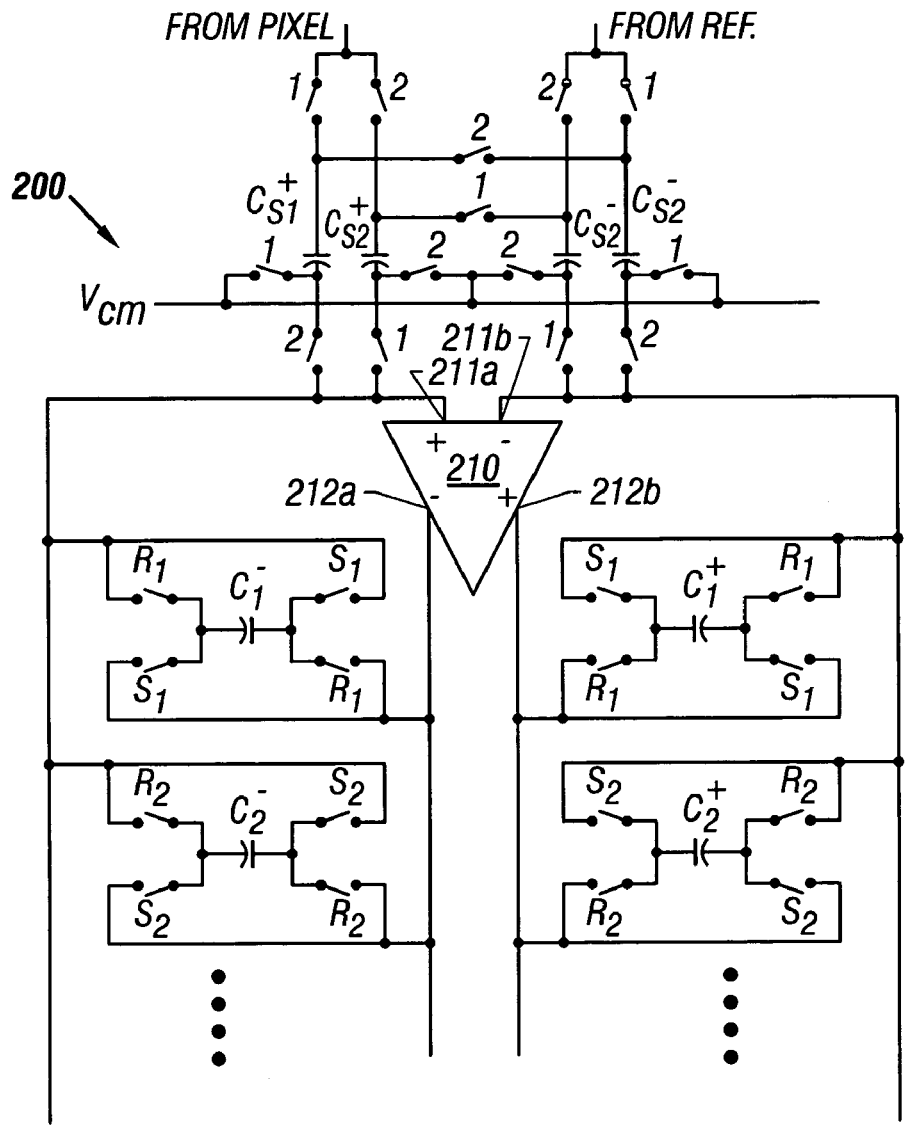
FIG. 2A shows one embodiment of a differential switched capacitor integrator as a building block for the integrator array shown in FIG. 1.
Figure 2B:
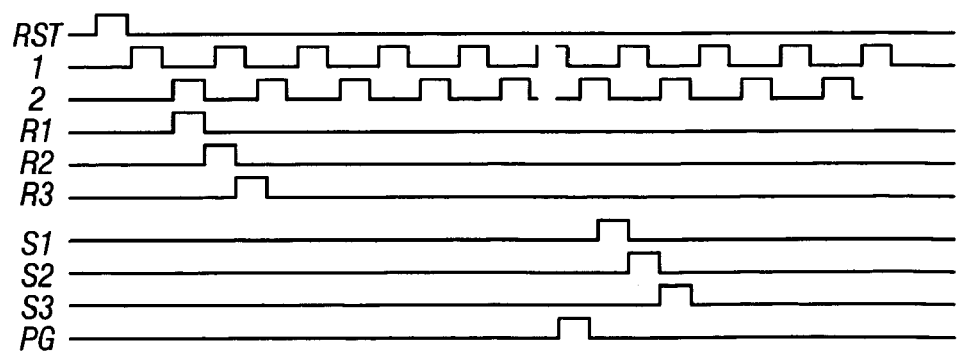
FIG. 2B shows the timing diagram in operating the integrator shown in FIG. 2A.

FIG. 2A shows one embodiment of a differential switched capacitor integrator column 200 as a building block for each column of integrators in the integrator array 120. FIG. 2B shows the timing diagram in operating the integrator 200 that is connected to a column of APS sensing pixels with a photogate design. The integrator column 200 includes all n integrators in a column. Only a single differential operational amplifier 210 is used for all n integrators for that column. The opamp 210 is connected to receive two different input signals, a first input from each pixel and a second input from a reference so that whenever a pixel is sampled, a reference level is also sampled to ensure the differential sampling and integration. During one frame time, each pixel is sampled twice to send the reset and the signal levels to the first input of the opamp 210 at two different times. Notably, each of the inputs of the opamp 210, the noninverting input 211a and inverting input 211b, is coupled to two alternative sampling capacitors (C+s1, C+s2, and C−s1, C−s2) to allow pipelined processing. A total of n pairs of integrating capacitors (C−1 and C+1, C−2 and C+2, ..., C−n and C+n) are coupled to the two differential outputs 212a and 212b to form the array of n integrators for that column. Switches 1 and 2 are used to couple the sampling capacitors to the APS array 110, the reference signal, and a common potential Vcm. Switches R1 and S1, R2 and S2, ..., Rn and Sn are implemented to properly couple the n pairs of integrating capacitors.

In operation, when one set of sampling capacitors (e.g., C+s1 and C−s1) are switched to sample the reset level from a pixel in row k, the dump level from the corresponding pixel in a previous row (k−1) is being summed in the switch capacitor integrator. Hence, a desired high processing speed is achieved by simultaneously carrying out sampling in one pixel and summing in an adjacent pixel, without having a high clock speed otherwise required.

Switched-capacitor integrators are implemented in fully-differential topology to reject common-mode noise, including clock coupling, ground noise, and charge-feedthrough. However, the use of two alternating sets of sampling capacitors precludes sampling of input signals against the opamp inputs. This prevents automatic offset correction because the bottom-plate potential for each sampling capacitor is no longer at the same potential during both the sample and the integration phases. Instead, the bottom-plate potential moves from $V_{cm}$ to $V_{cm}+V_{off}$, where $V_{off}$ is the input-induced offset. In a typical time-delayed integration imaging environment, signal levels from individual pixels are generally small and can be even less than typical opamp offsets. Thus, it can be desirable to achieve offset-free integration, without sacrificing speed and power.

The imaging device 200 is designed in part to achieve desired offset-cancellation while maintaining high speed pixel integration. Signal from a pixel is generated by subtracting the reset potential from the sense node potential (dump potential) after the photoelectrons have been dumped on it. This is accomplished by sampling integrating the reset potential for a given pixel, followed by sample-and-integration of the dump potential. The timing diagram in FIG. 2B shows that the high speed operation is achieved by simultaneously resetting all pixels. Then the reset potentials from successive rows are successively integrated on the respective column capacitors ($C1^+$ & $C1^-$, $C2^+$ & $C2^-$, ...) in a fully-differential fashion. This is carried out by successively pulsing R1, R2, ..., and Rn.

Once all the reset values are stored in the capacitors, photo-charges from all pixels are simultaneously dumped on the respective sense nodes. Following this, the sense node potentials (dump potentials) are successively integrated on the same set of capacitors. The offset charge accumulated during sample-and-integration of the reset potentials are eliminated during sample-and-integration of the dump potentials by connecting the feedback capacitors with their plates reversed as indicated by the switching of S1, S2, and Sn. Thus, the scheme achieves offset-free integration.

Figure 3A:
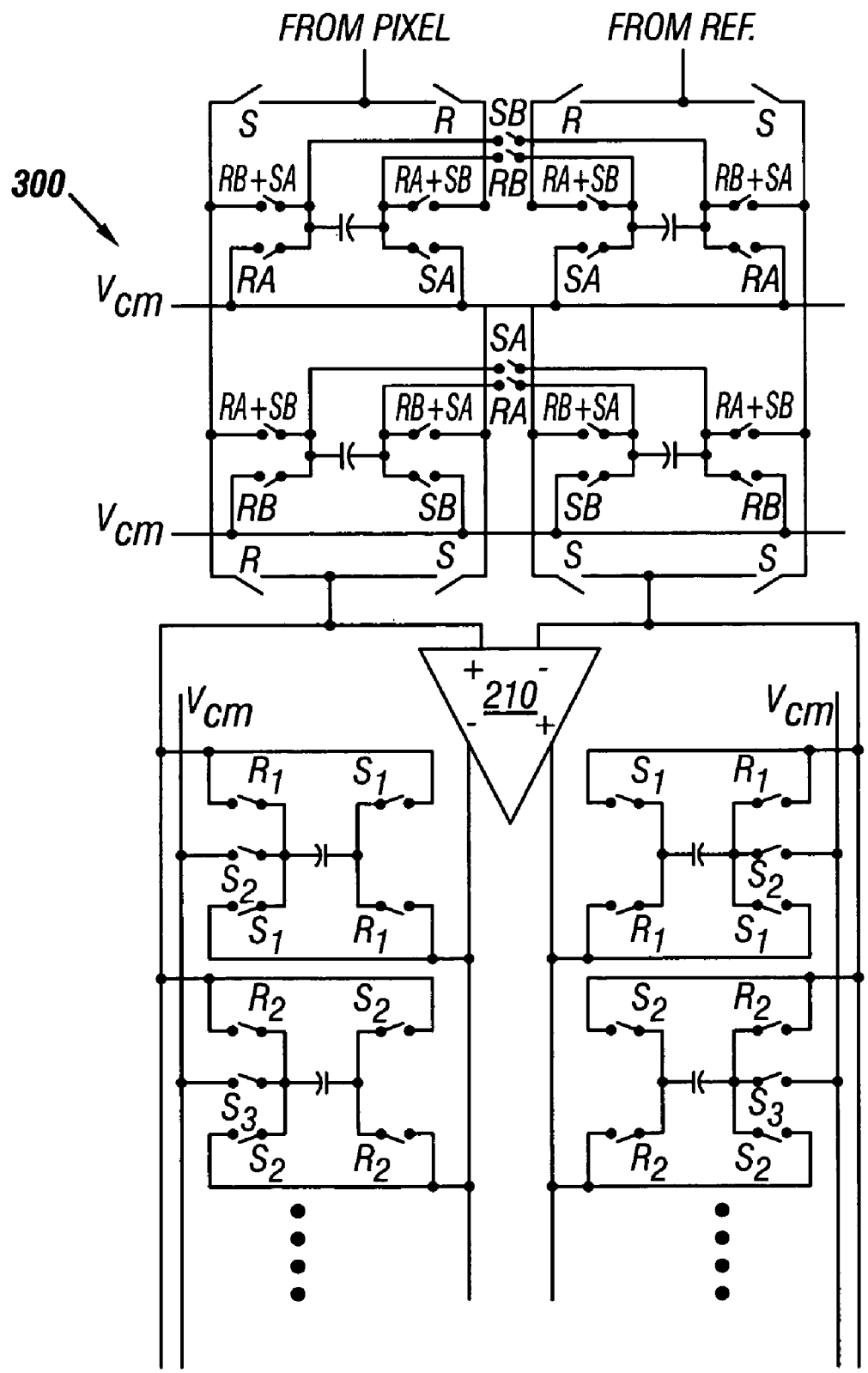
FIGS. 3A, 3B, 4A, 4B, 5A and 5B show examples of switched capacitor integrator based on a fully-differential amplifier and their respective timing diagrams for operating the switches.

FIG. 3A shows another embodiment of a differential switched capacitor integrator column 300. This design improves the design 200 shown in FIG. 2A by reducing parasitic capacitance effects. For typical VLSI capacitor implementation, the bottom-plate parasitic capacitance can be significant under some circumstances, e.g., about 25% pf the total capacitance. Therefore, the reversal of the capacitor plates between the two phases causes a differential charging of the parasitic capacitance to different potential determined by the signal levels. Since successive integrations are carried out with successive pixels, the presence of voltage dependent charges on the parasitic capacitance can lead to non-linearity in the integration and pixel-to-pixel smear. Hence, it is desirable to reduce the effects of parasitic capacitance.

The design 300 in FIG. 3A can be used to achieve the above goal without introducing noticeable offset or significantly reducing operating speed. The technique includes reversing polarities of both the sampling and the integrating capacitors. As a result, the parasitic capacitance connected to the opamp input is due to either the feedback or the sampling capacitor, but not both. Thus, the charge on the parasitic capacitance is compensated in every other phase. This can essentially eliminate the associated parasitic effects. In order to prevent pixel-to-pixel smearing, an additional switch connected to $V_{cm}$ is employed. This allows the parasitic capacitance to be charged to $V_{cm}$, irrespective of the output potential in the previous phase, eliminating signal-dependent charge injection from the parasitic capacitances.

Figure 3B:
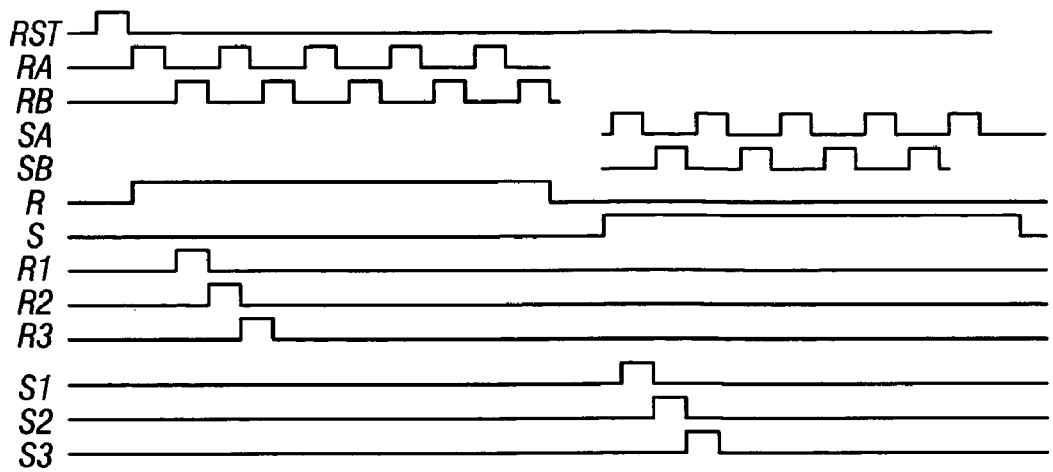

FIG. 3B shows the timing diagram for operating the switches in the device 300.

Figure 4A:
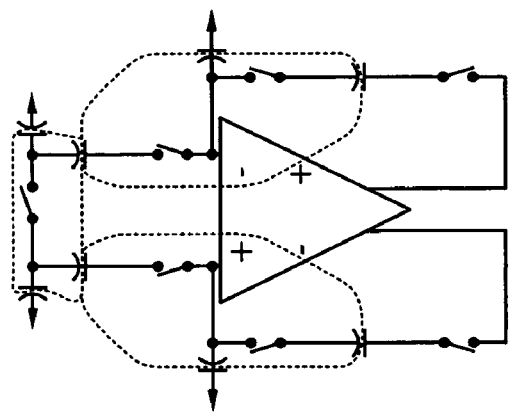
Figure 4B:
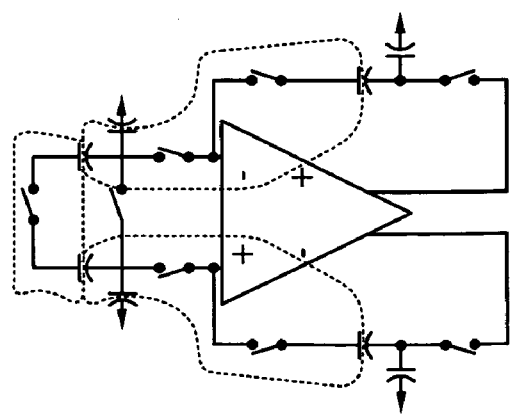

The operation of the device 300 may be understood from the simplified circuits shown in FIGS. 4A and 4B. Each integration cycle includes two phases, the first phase (R-phase) for sampling and integrating the reset level ($V_m$), and a second phase (D-phase) for the dump level ($V_{dn}$). For R phase in the n-th cycle, charge conservation before and after the switches are closed following the sampling of the reset signal yields:

$$V_{cm} - V_c + V_n^+ - V_{cm} - V_{off}^- + \alpha \cdot \hat{V}_m + \alpha \cdot V_{off}^- + V_{cm} - V_{off}^- - \hat{V}_n^+$$

$$\hat{V}_n^+ = -V_n^+ + 2 \cdot V_{cm} + 3 \cdot V_{off}^- + \alpha \cdot (V_{off}^- - V_{cm}) + \frac{V_c - V_m}{2} + \frac{V_{off}^- + V_{off}^+}{2}$$

$$\hat{V}_n^- = V_n^- + 2 \cdot V_{cm} + 3 \cdot V_{off}^+ + \alpha \cdot (V_{off}^+ - V_{cm}) + \frac{V_m - V_c}{2} + \frac{V_{off}^- + V_{off}^+}{2}$$

$$\hat{V}_m = \frac{V_c + V_m}{2} - \frac{V_{off}^- + V_{off}^+}{2}$$

where $V_{cm}$ is the common-mode voltage, $\hat{V}_m$ is the potential on the sampling capacitors after they have been shorted during the n-th phase, $V_{off}^+$ ($V_{off}^-$) is the input-referred offset for the non-inverting (inverting) inputs, $\hat{V}_n^+$ ($\hat{V}_n^-$) is the non-inverting (inverting) output for the n-th cycle, R-phase, and $\alpha$ is the ratio between the parasitic and the actual capacitance.

In the next phase, both the sampling and the feedback capacitors are reversed in polarity, causing the parasitic capacitance to swap places. The swap ensures that the total parasitic capacitance at the opamp input remains the same. The charge conservation in D-phase leads to the following:

$$V_{n+1}^+ = -\hat{V}_n^+ + 2 \cdot V_{cm} + 3 \cdot V_{off}^- + \alpha \cdot (V_{off}^- - V_{cm}) + \frac{V_c - V_{dn}}{2} + \frac{V_{off}^- + V_{off}^+}{2}$$

$$V_{n+1}^- = -\hat{V}_n^- + 2 \cdot V_{cm} + 3 \cdot V_{off}^+ + \alpha \cdot (V_{off}^+ - V_{cm}) + \frac{V_{dn} - V_c}{2} + \frac{V_{off}^- + V_{off}^+}{2}$$

$$\hat{V}_{dn} = \frac{V_c + V_{dn}}{2} - \frac{V_{off}^- + V_{off}^+}{2}$$

Thus, after the D-phase is over the charge stored in the feedback capacitor is the integrated value of all previous n-cycles, each cycle representing signal values from successive pixels, and the opamp offset and the effect of parasitic capacitance is completely eliminated. At the end of the cycle, the output ends of the capacitors are briefly connected to $V_{cm}$ to remove any signal dependence. The output can be written as:

$$V_{n+1}^+ = V_n^+ + \frac{V_m + V_{dn}}{2}; \ V_{n+1}^- = -V_n^- + \frac{V_{dn} - V_m}{2}.$$

The remaining offset is due to the integrator reset phase, when the input and the output of the opamp is connected together to provide the initial level ($V_0^+$ and $V_0^+$). In this process, the charges stored on the feedback capacitors are completely removed. The offset can be easily eliminated by carrying out the integrator reset with one end of the feedback capacitor connected to the opamp input, and the other end connected to $V_{cm}$. This ensures that the offset is stored in the capacitor and is exactly cancelled in the subsequent phases. No more switches are necessary, since each feedback capacitor is connected to $V_{cm}$ through a switch anyway.

Figure 5A:
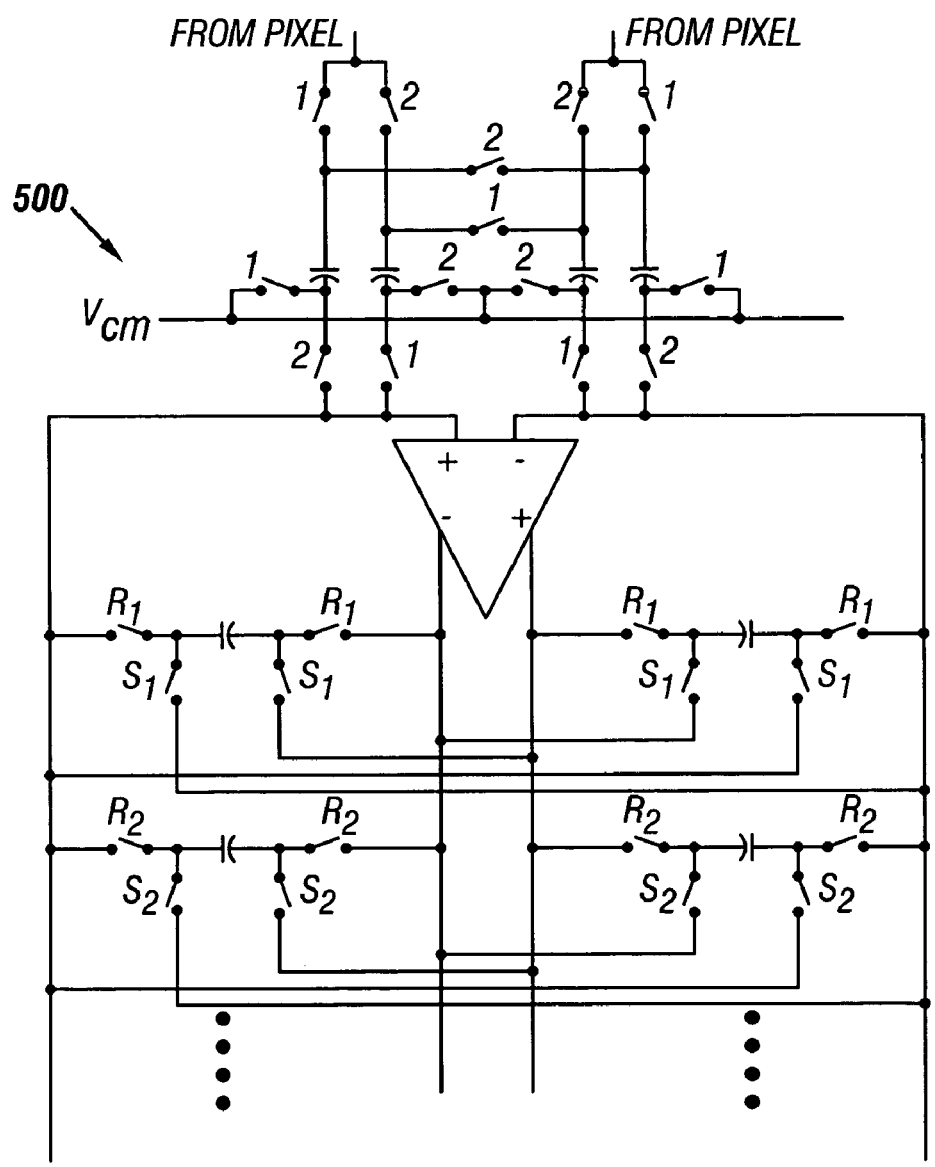
Figure 5B:
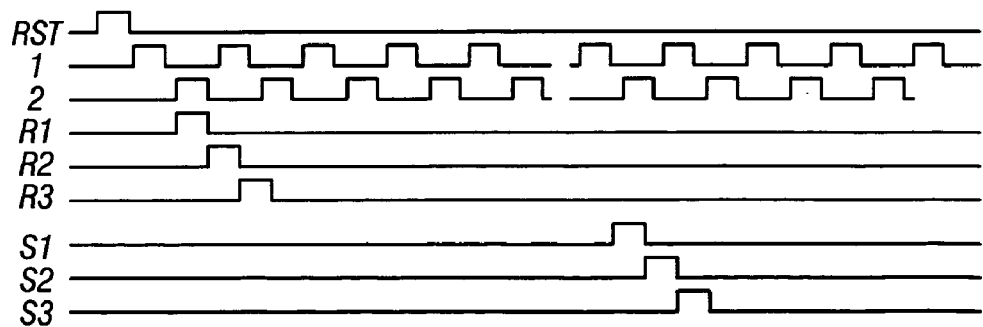

FIG. 5A shows another design 500 as an alternative to the design 300 shown in FIG. 3A. In this approach, the positions of the feedback capacitors are swapped between the inverting and the non-inverting sides of the amplifier during every half cycle as indicated by the timing diagram shown in FIG. 5B. Thus, the offset charge accumulated during the R-phase is exactly compensated by an equal amount of charge of opposite polarity during the D-phase. The capacitors are laid out in a manner that the bottom plates (shown by the curved in the schematic) of the capacitors are always connected to a low-impedance line, and never to the opamp input. This ensures that the parasitic capacitance does not introduce any non-linearity or other errors. The capacitors are connected either between the inverting input and non-inverting output or between the non-inverting input and the inverting output. The circuit can works equally well if the capacitor connections are reversed. While this design is simpler by having less number of switches and simpler timing than the implementation 300 shown in FIG. 3A, the latter does have lower cross-talk since the capacitors are never switched from one side of the fully-differential amplifier to the other.

The devices shown in FIGS. 3A and 5A still have a residual offset even though both can cancel opamp offsets during every summing operation. This residual offset is introduced in the integrator reset phase when the input and the output of the opamp are connected together to provide the initial level ($V_o^+$ and $V_o^+$). In this process, the charges stored on the feedback capacitors are completely removed. This offset can be also be reduced by carrying out the integrator reset with one end of the feedback capacitor connected to the opamp input, and the other end connected to $V_{cm}$. This ensures that the offset is stored in the capacitor and is exactly cancelled in the subsequent phases. Nor more switches are necessary, since each feedback capacitor is connected to $V_{cm}$ through a switch anyway.

The differential operational amplifier 210 used in the above designs for common-mode correction is used to drive the capacitors in the integrator capacitor bank. Because the amplifier 210 has both an out+ and out− outputs, it is referred to as being fully differential.

Figure 6:
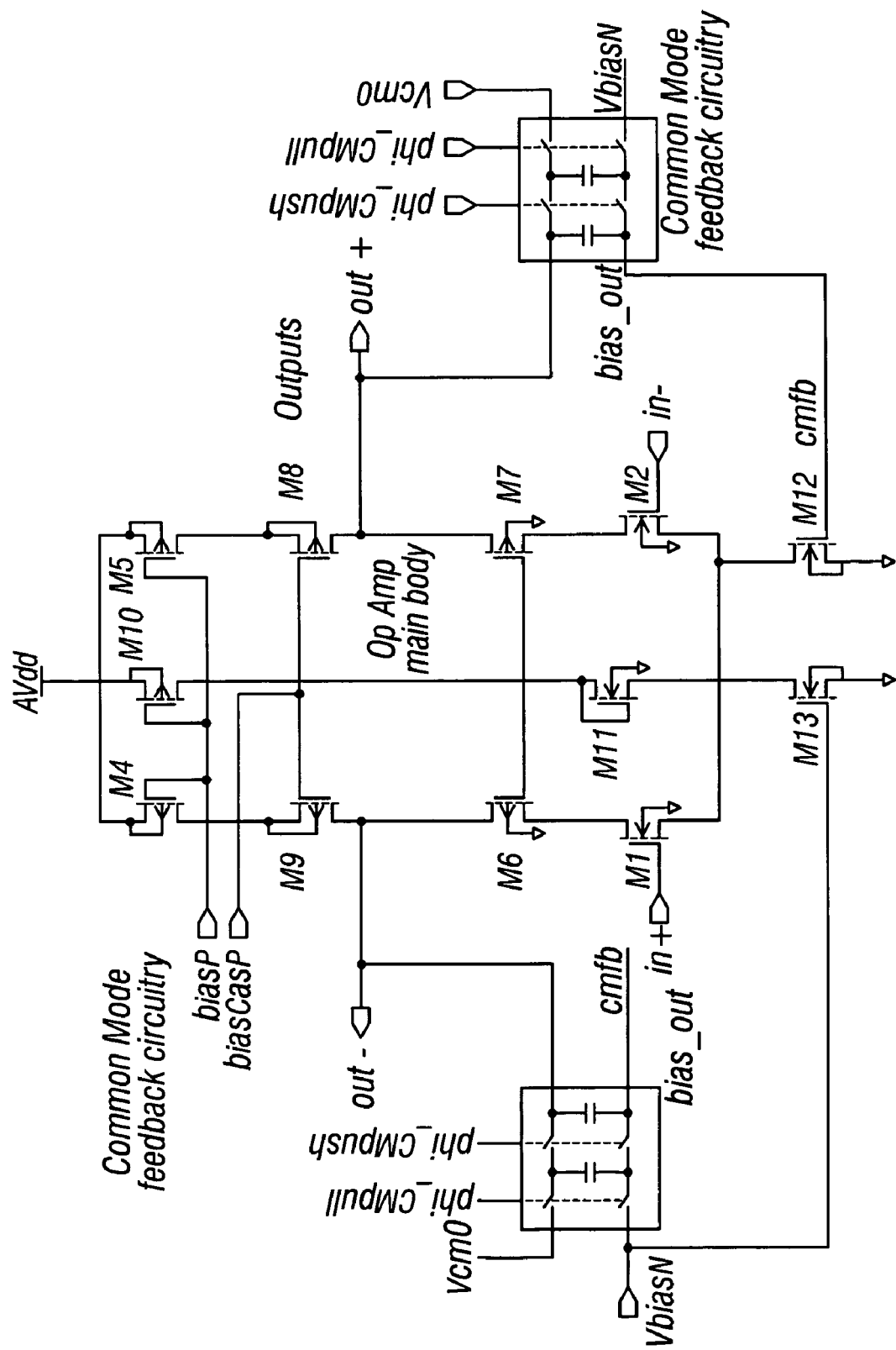
FIG. 6 shows one embodiment of a fully-differential amplifier.

FIG. 6 shows one embodiment of the amplifier 210. The two outputs move symmetrically away from a common-mode voltage so that:

$$Out + = V_{common\ mode} + \frac{1}{2} V_{out}$$

$$Out - = V_{common\ mode} - \frac{1}{2} V_{out}$$

The amplifier 210 is designed to be completely symmetric in order to reject common-mode noise. The design is a single-stage telescopic cascade amplifier.

The key to the amplifier 210 is the differential pair formed by the NFETs M1 and M2 with their sources connected together. The common source current is set by the load FE7 M3, whose gate is biased by the voltage biasN. The differential pair is also connected to a set of PFET load transistors M4 and M5, connected as a current mirror and biased by the voltage biasP. The voltage biasN determines the load current in M3. The sum of the currents of M1 and M2 must be equal to this fixed load current, but the current is divided between M1 and M2 on the basis of the input voltages in+ and in−. The current through M1 and M2 determine the current in the entire left or right branch of the circuit. The impedance of M4 and M5 convert the branch currents back into the respective voltages out+ and out−, creating the amplifier action.

The NFET transistors M6 and M7, and PFET transistors M0 and M9 are cascade transistors. These hold the drains of the NFET differential pair, and the PFET load transistors, respectively, at a nearly constant voltage so the current in the FETs doesn't change as the output voltages swing. This increases the effective impedance of the FETs and therefore results in a corresponding increase in gain. The bias voltage for the PFET cascades comes directly from biasCasP. The voltage for the NFET cascades is developed from biasP by the combination of M10 and M11.

The amplifier 210 has a common-mode feedback circuit that maintains a fixed common mode voltage, that is, a feedback mechanism keeps the $V_{common\ mode}$ constant. The op amp contains two of the common-mode feedback circuit blocks, one connected to each output (out+ and out−). The one end of the primary capacitor of each block is connected to its respective output; the other ends of the capacitors are connected together. This common node averages the output voltage, and so provides a measure of the actual common mode voltage, in the ac sense. This common node, labeled "cmfb" on the schematic, is connected to the gate of transistor M12, providing common-mode feedback, If the actual common mode voltage drifts up, the gate voltage of M12 increases, increasing the current in both the right and left branches of the amplifier, therefore forcing the common mode voltage back down. Conversely, if the actual common mode voltage drifts down, the current through M12 is reduced, forcing the common-mode voltage back up. In this way, the common mode voltage is stabilized.

In a d.c. sense, the switched capacitors set a fixed offset between the common mode voltage and the cmfb voltage on the gate of M12. This is done by cycling the switch voltages marked phi_CMpull and phi_CMpush. The phi_CMpuii phase causes the flying capacitors to be connected to VcmO and biasN, the bias on the load FET M3. This charges the flying capacitor to the difference between these potentials. The phi_Cmpush phase "pushes" this voltage onto the primary capacitors.

In a given phase, there is charge sharing between the capacitors, so that the combined voltage when they are connected together divides the difference between the previous primary capacitor voltage and the desired push voltage. However, every cycle moves it closer to the push value, and after a few cycles the voltage is practically set to this value.

Figure 7A:
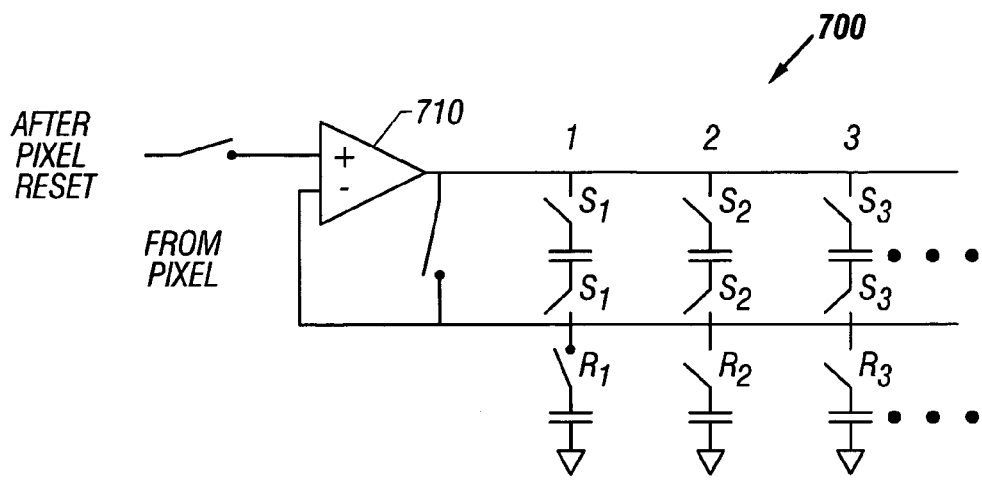
FIGS. 7A and 7B show a switched capacitor integrator based on a single-ended amplifier.
Figure 7B:
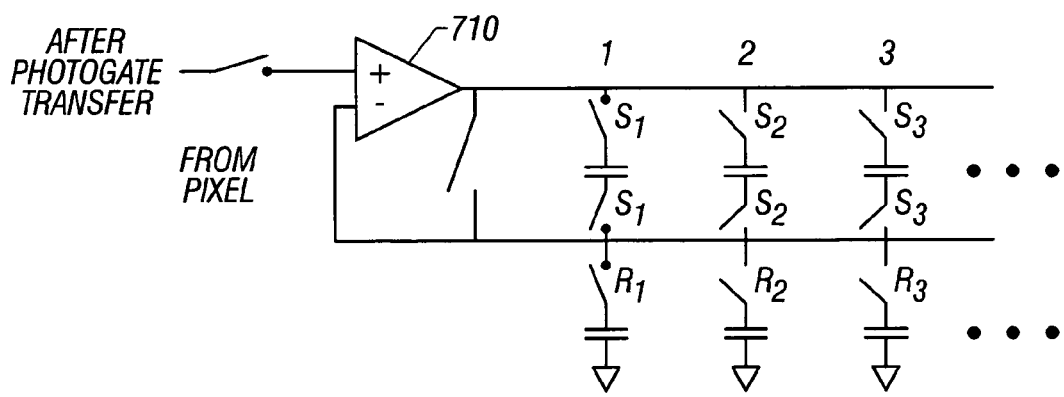
Figure 7C:
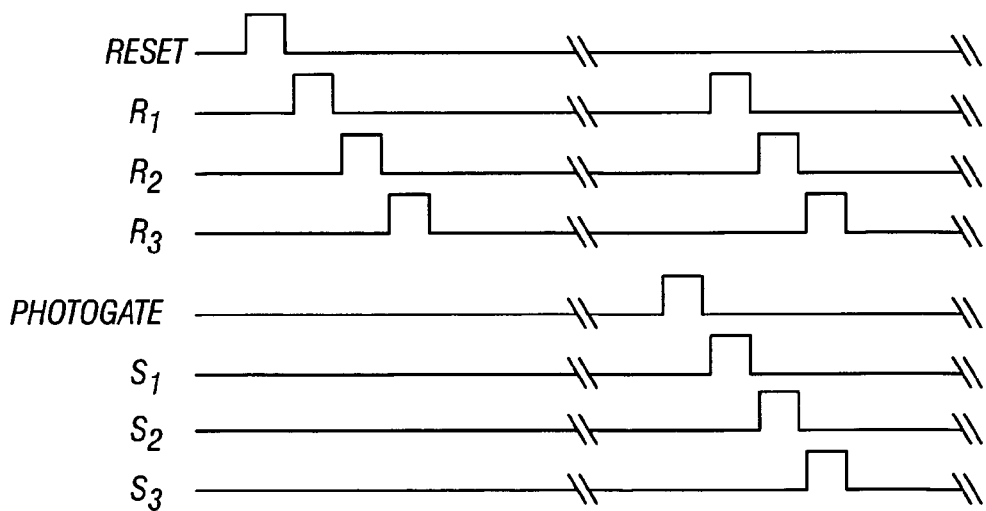
FIG. 7C shows a timing diagram for operating the switches in the device shown in FIGS. 7A and 7B.

It is further contemplated that the integrator array 120 of the imaging device 100 in FIG. 1 may also be implemented by using a single-ended opamp to reduce the physical size of the integrator array 210. The above differential integrators need a common-mode feedback to keep the fully-differentiated opamp in bias. Such feedback circuit can occupy a significant amount of the chip area. FIGS. 7A and 7B show one embodiment of a switched capacitor integrator 700 by using a single ended opamp 710. FIG. 7C shows the timing diagram for operating the switches. The integrator 700 can perform the correlated double sampling to reduce the offset. Notably, only the integrated difference between the reset and the signal levels is stored in the integrating capacitors.

A number of specific embodiments are disclosed herein. Nevertheless, various modifications may be made without departing from the scope of the following claims.

What is claimed is:

1. An imaging device, comprising:
   a photosensing array of a plurality of sensing pixels arranged in rows and columns, each pixel having a photosensing element to produce charge in response to incident photons from an object and an in-pixel circuit to convert said charge into an electrical pixel signal representing said charge; and
   an integrator array of a plurality of integrators arranged in rows and columns respectively equal to said rows and columns of said photosensing array,
   wherein integrators of each column are coupled to receive electrical pixel signals from only one designated column of sensing pixels in said photosensing array and are operable to produce time-delayed integration signals representing the object after each sensing pixel is sampled and read out for a number of times equal to a number of said rows in said photosensing array.

2. The device as in claim 1, wherein each integrator in said integrator array includes a capacitor-switched integrator.

3. An imaging device, comprising:
   a photosensing array of a plurality of sensing pixels arranged in rows and columns, each pixel having a photosensing element to produce charge in response to incident photons from an object and an in-pixel circuit to convert said charge into an electrical pixel signal representing said charge; and
   an integrator array of a plurality of integrators arranged in rows and columns respectively equal to said rows and columns of said photosensing array, wherein integrators of each column are coupled to receive electrical pixel signals from only one designated column of sensing pixels in said photosensing array and are operable to produce time-delayed integration signals representing the object after each sensing pixel is sampled and read out for a number of times equal to a number of said rows in said photosensing array, wherein each integrator in said integrator array includes a capacitor-switched integrator, and wherein an operation of one integrator on a signal from one sensing pixel is temporarily overlapped with another operation of an adjacent integrator on another signal from a respective adjacent sensing pixel.

4. An imaging device, comprising:

a photosensing array of a plurality of sensing pixels arranged in rows and columns, each pixel having a photosensing element to produce charge in response to incident photons from an object and an in-pixel circuit to convert said charge into an electrical pixel signal representing said charge; and an integrator array of a plurality of integrators arranged in rows and columns respectively equal to said rows and columns of said photosensing array, wherein integrators of each column are coupled to receive electrical pixel signals from only one designated column of sensing pixels in said photosensing array and are operable to produce time-delayed integration signals representing the object after each sensing pixel is sampled and read out for a number of times equal to a number of said rows in said photosensing array, wherein each integrator in said integrator array includes a capacitor-switched integrator, and wherein a single input terminal of said capacitor-switched integrator is coupled to a first sampling capacitor that stores a first signal from a first sensing pixel and a second sampling capacitor that stores a second signal from a second sensing pixel adjacent to said first sensing pixel, said first and second signals being generated at different times.

5. An imaging device, comprising:

a photosensing array of a plurality of sensing pixels arranged in rows and columns, each pixel having a photosensing element to produce charge in response to incident photons from an object and an in-pixel circuit to convert said charge into an electrical pixel signal representing said charge; and an integrator array of a plurality of integrators arranged in rows and columns respectively equal to said rows and columns of said photosensing array, wherein integrators of each column are coupled to receive electrical pixel signals from only one designated column of sensing pixels in said photosensing array and are operable to produce time-delayed integration signals representing the object after each sensing pixel is sampled and read out for a number of times equal to a number of said rows in said photosensing array, wherein each integrator in said integrator array includes a capacitor-switched integrator, and wherein said capacitor-switched integrator is a differential integrator which has a first input terminal to receive an electrical pixel signal and a second input terminal to receive a reference signal.

6. An imaging device, comprising:

a photosensing array of a plurality of sensing pixels arranged in rows and columns, each pixel having a photosensing element to produce charge in response to incident photons from an object and an in-pixel circuit to convert said charge into an electrical pixel signal representing said charge; and an integrator array of a plurality of integrators arranged in rows and columns respectively equal to said rows and columns of said photosensing array, wherein integrators of each column are coupled to receive electrical pixel signals from only one designated column of sensing pixels in said photosensing array and are operable to produce time-delayed integration signals representing the object after each sensing pixel is sampled and read out for a number of times equal to a number of said rows in said photosensing array, wherein each integrator in said integrator array includes a capacitor-switched integrator, and wherein said capacitor-switched integrator includes a single-ended amplifier whose output is coupled to a circuit having a reset sampling capacitor, an integrating capacitor, and a plurality of switches, said switches positioned in said circuit to connect said reset sampling capacitor and said integrating capacitor to store only a difference between a reset potential and a signal potential from a pixel into said integrating capacitor.

7. The device as in claim 1, wherein said in-pixel circuit includes an amplifier.

8. The device as in claim 1, wherein said photosensing element includes a photogate or a photodiode.

9. The device as in claim 1, wherein said sensing pixels are reset at the same time.

10. The device as in claim 1, further comprising at least one ADC coupled to digitize an output from said integrator array.

11. The device as in claim 1, wherein each sensing pixel is sampled for a first time to produce a reset value and for a second time after a photo-induced signal is generated to produce a signal value for each readout.

12. An imaging device, comprising:

a substrate formed of a semiconductor;

a sensing array of active pixel sensors in n rows and m columns fabricated on a first area of said substrate, operable to respond to photons to produce electrical pixel signals; and an integrator array fabricated on a second area of said substrate adjacent to said first area, said integrator array having m amplifiers electrically coupled to said m columns of active pixel sensors, respectively, wherein each amplifier is coupled to n pairs of capacitors so that each pair of capacitors accumulate electrical pixel signals from n different active pixel sensors in a respective column that are generated at different times to produce a summed signal.

13. The device as in claim 12, wherein each amplifier samples each sensing pixel twice during each readout to obtain a differential pixel signal between a reset value and a photon-induced signal value of said each sensing pixel.

14. The device as in claim 13, wherein each pair of capacitors are coupled to a respective amplifier in a way that one capacitor receives said reset value and another capacitor receives said photon-induced signal value.

15. The device as in claim 14, wherein each amplifier is a differential amplifier which has a first input coupled to a designated column of active pixel sensors and a second input coupled to a reference.

16. A method for imaging an object, comprising:

using a linear sensing array of pixels along a predetermined direction to capture radiation from the object that moves relative to the sensing array along the direction;

internally converting radiation-induced charge in each pixel of the array into an electrical pixel signal;

coupling a linear integrator array of integrators to the sensing array to sample multiple frames of images of the object generated by the sensing array;

spatially shifting the mapping from the sensing array to the integrator array in sampling the different frames along the predetermined direction to produce a summed signal that sums pixel signals from different pixel locations of different frames corresponding to a common image from a location on the object;

sampling each pixel twice in each frame to obtain a differential value between a reset level and a signal level of each pixel; and temporarily overlapping sampling a reset level of a first pixel and sampling a signal level of a second adjacent pixel.

17. The method as in claim 16, wherein each integrator includes a switched-capacitor integrator.

* * * * *